Figure 3A:
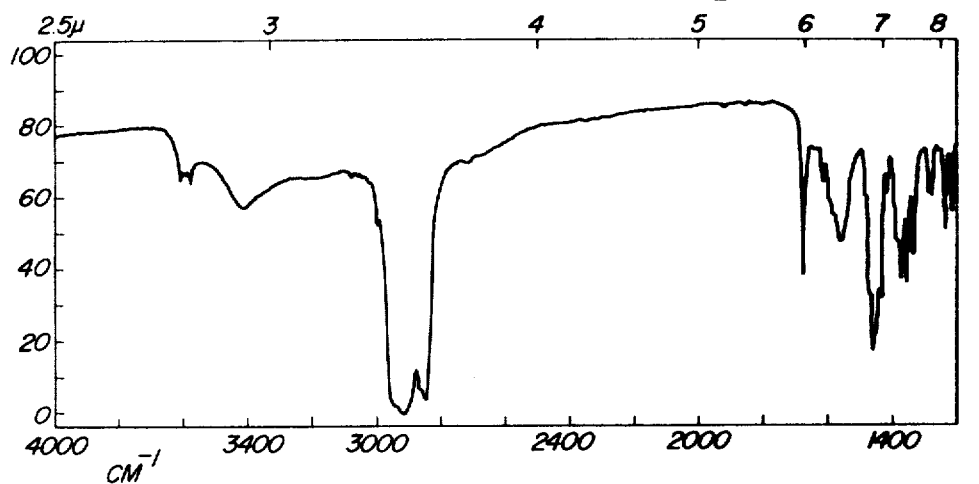
Figure 3B:
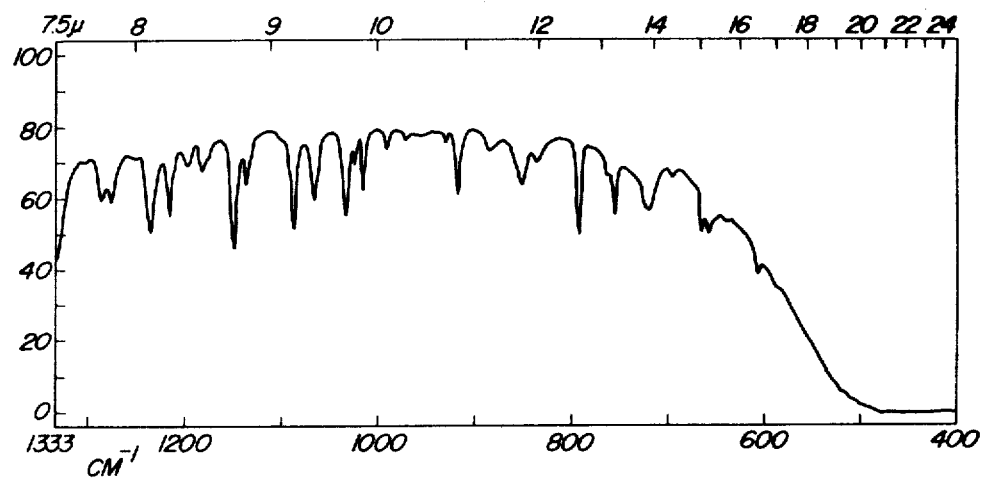
Figure 4A:
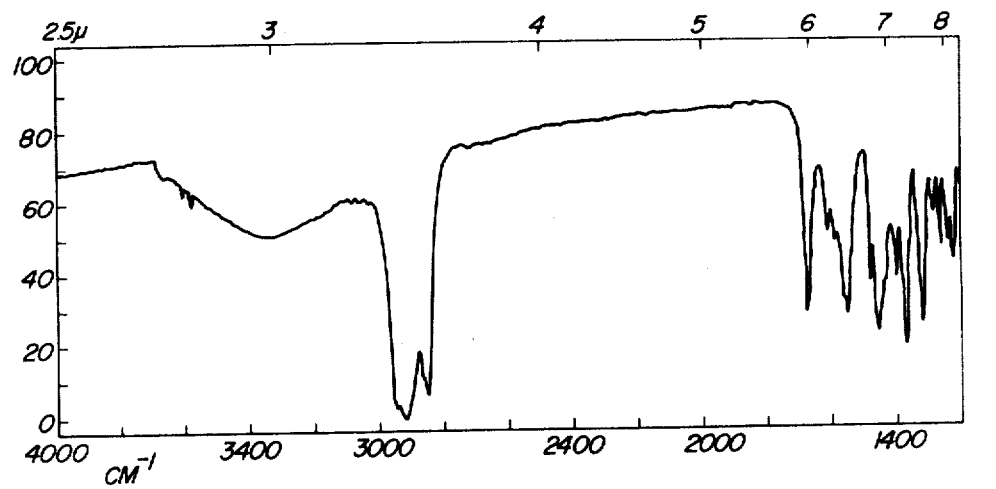
Figure 4B:
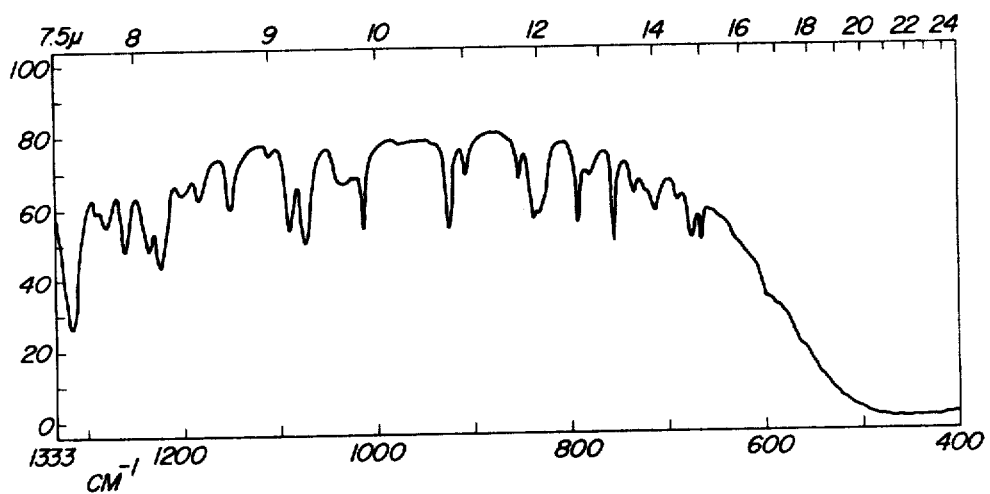

United States Patent

Sato et al.

[15] 3,669,987
[45] June 13, 1972

[54] SALTS OF INDOLE DERIVATIVES AND A PROCESS FOR PREPARING THE SAME

[72] Inventors: Nobuyasu Sato, Itami-shi; Toshio Nakamura; Hiroshi Takenaka, both of Ibaragi-shi, all of Japan

[73] Assignee: Sumitomo Chemical Company, Ltd., Osaka, Japan

[22] Filed: April 9, 1968

[21] Appl. No.: 719,939

[30] Foreign Application Priority Data

April 11, 1967 Japan..................................42/23337

[52] U.S. Cl. ......................260/326.13 A, 424/266, 424/274, 260/211 R, 260/248.5, 260/256.6, 260/270 R, 260/285.5, 260/296 R, 260/309, 260/311, 260/326.12 A, 260/326.14 A
[51] Int. Cl. .......................................................C07d 27/56
[58] Field of Search..............260/240 J, 326.13 A, 326.14 A, 260/326.12 A, 270 R

[56] References Cited

UNITED STATES PATENTS

| | | |
|---|---|---|
| 3,161,654 | 12/1964 | Shen..............................260/326.14 X |
| 3,190,889 | 6/1965 | Shen..............................260/326.14 X |
| 3,242,185 | 3/1966 | Shen..............................260/326.13 X |

OTHER PUBLICATIONS

Blatt, " Organic Syntheses," Collective Volume 2, frontispage and pages 376 to 377, John Wiley and Sons, NY 1943

Hickinbottom, Reaction of Organic Compounds 2nd Ed., frontispage and pages 224 to 225, NY 1948, Longmans, Green and Co.

*Primary Examiner*—John D. Randolph
*Attorney*—Stevens, Davis, Miller & Mosher

[57] ABSTRACT

Alkali metal salts or organic amine molecular compounds of such 1-acyl-3-indolylaliphatic acid derivatives as 1-(p-chlorobenzoyl)-2-methyl-5-methoxy-3-indolylacetic acid, 1-cinnamoyl-2-methyl-5-methoxy-3-indolylacetic acid or 1-nicotinoyl-2-methyl-5-methoxy-3-indolylacetic acid are prepared by dissolving about 1 mole of said 1-acyl-3-indolylaliphatic acid derivative in acetone or methanol, reacting in the presence of a small amount of water the resultant solution with about 0.5 mole of alkali metal carbonate, or about 1 mole of alkali metal bicarbonate or with about 1 mole of an organic amine and distilling off acetone or methanol and water from the reaction mixture to yield the alkali metal salt or organic amine molecular compound.

Alkaline earth metal or aluminum salt or said 1-acyl-3-indolylaliphatic acid derivative is prepared by reacting a soluble salt of alkaline earth metal or aluminum with an aqueous solution containing said alkali metal salt of 1-acyl-3-indolylaliphatic acid derivative. These alkali metal salts or organic amine molecular compounds are enable to make solid injections for anti-inflammatory drugs.

4 Claims. 17 Drawing Figures

FIG. 1A
SODIUM SALT OF ⌈N-(P-CHLOROBENZOYL)-2-METHYL-5-METHOXY-3-INDOLYLACETIC ACID⌋
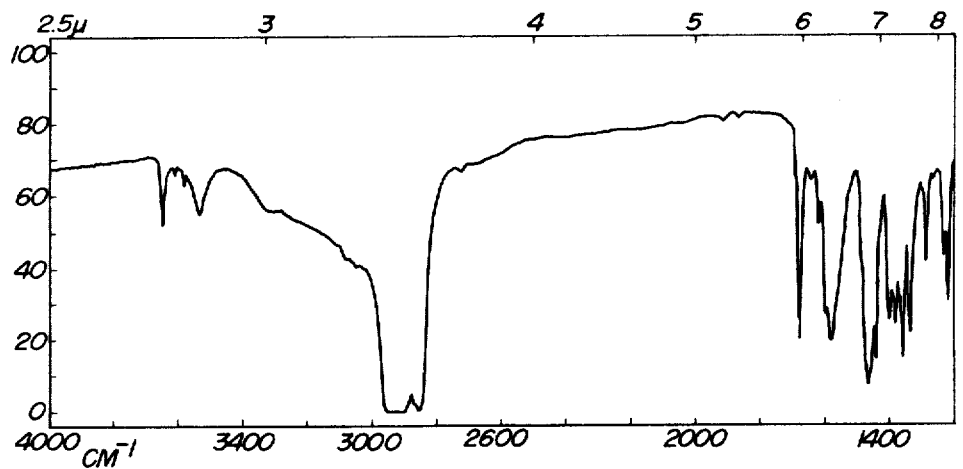
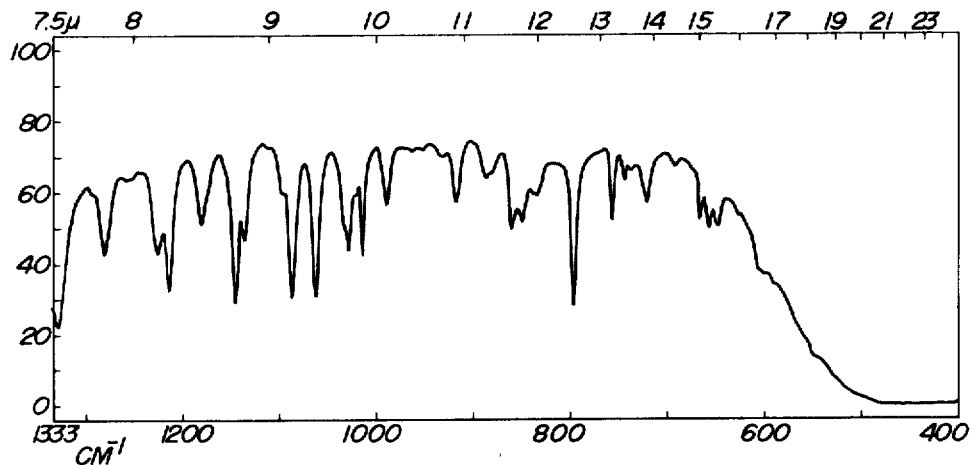
FIG. 1B

FIG. 2A
POTASSIUM SALT OF [N-(P-CHLOROBENZOYL)-2-METHYL-5-METHOXY-3-INDOLYLACETIC ACID]
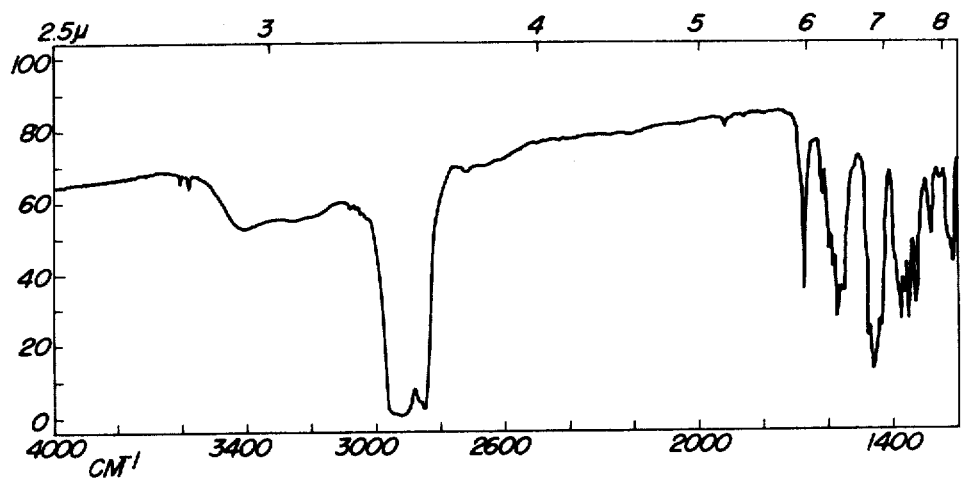
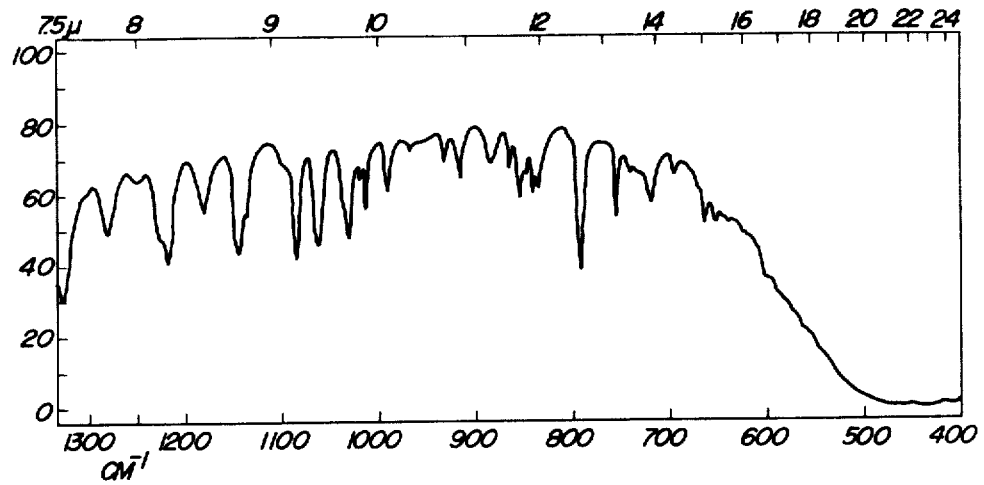
FIG. 2B

MAGNESIUM SALT OF ⌈N-(P-CHLOROBENZOYL)-2-METHYL-5-METHOXY-3-INDOLYLACETIC ACID⌋

CALCIUM SALT OF ⌈N-(P-CHLOROBENZOYL)-2-METHYL-5-METHOXY-3-INDOLYLACETIC ACID⌋

FIG. 5A
STRONTIUM SALT OF ⌈N-(P-CHLOROBENZOYL)-2-METHYL-5-METHOXY-3-INDOLYLACETIC ACID⌋
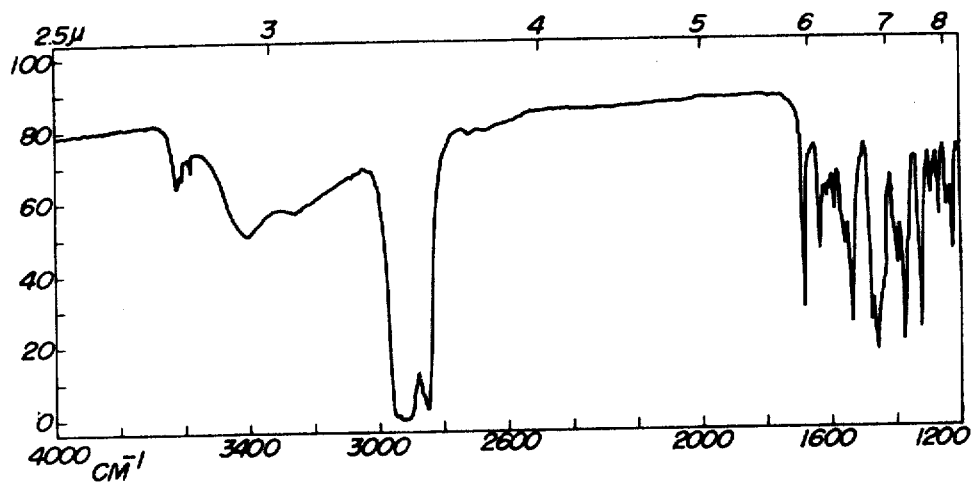
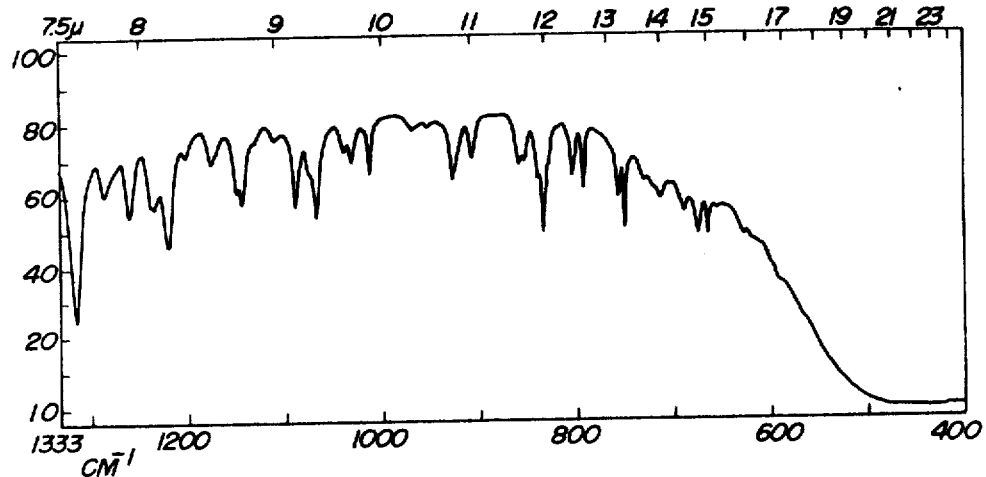
FIG. 5B

FIG. 6A
ALUMINUM SALT OF [N-(P-CHLOROBENZOYL)-2-METHYL-5-METHOXY-3-INDOLYLACETIC ACID]
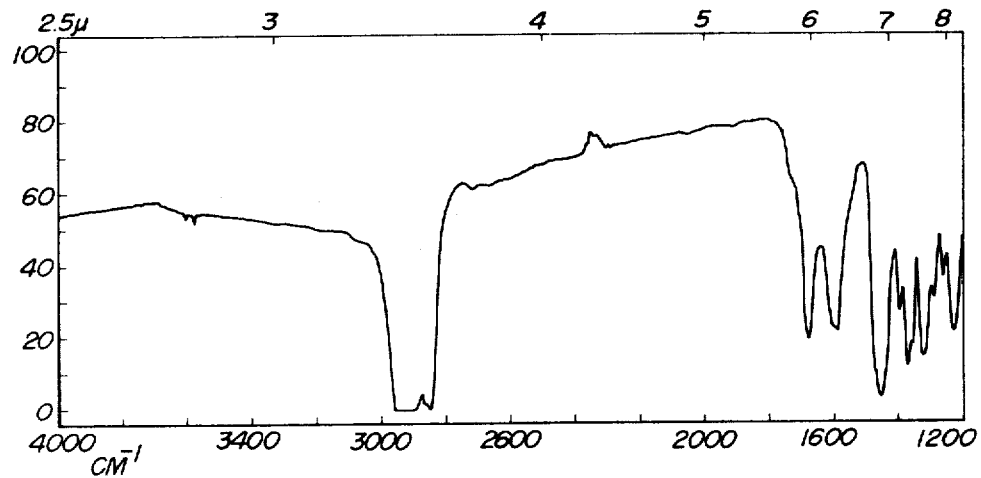
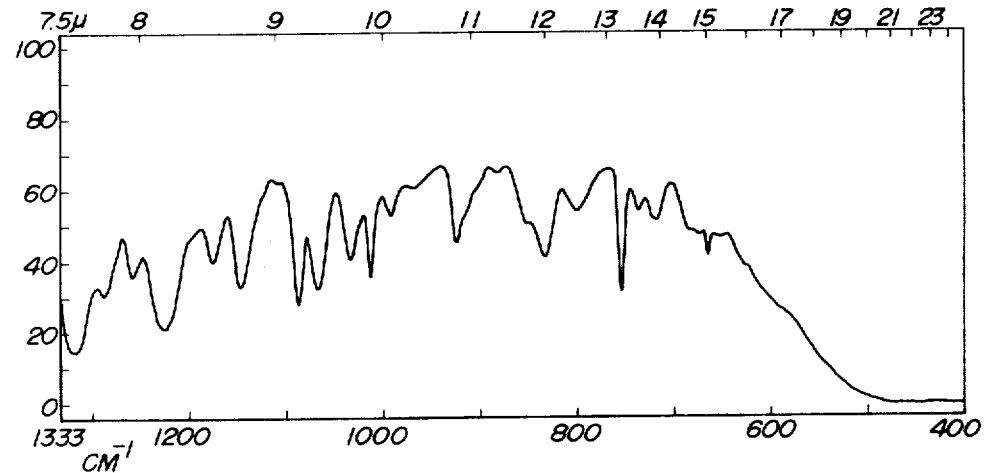
FIG. 6B

FIG. 7A
ARGININE-MOLECULAR COMPOUND OF ⌈N-(P-CHLOROBENZOYL)-2-METHYL-5-METHOXY-3-INDOLYLACETIC ACID⌋
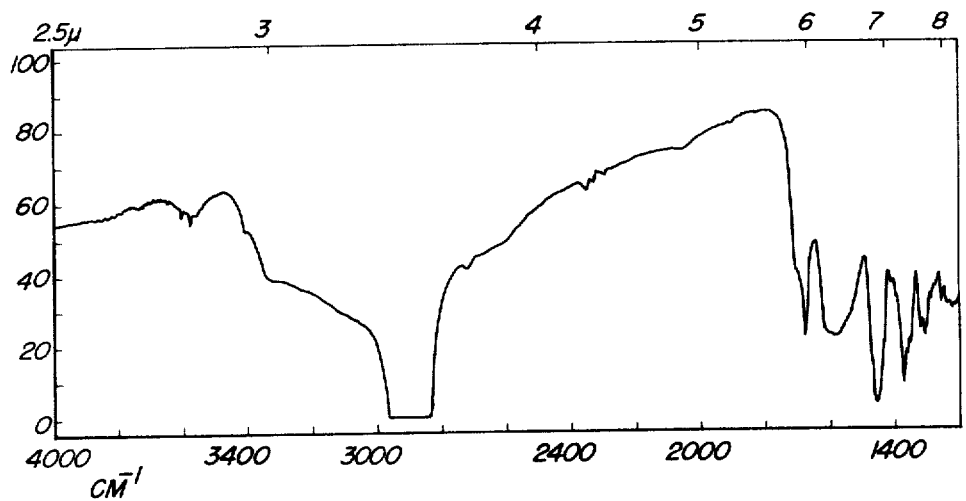
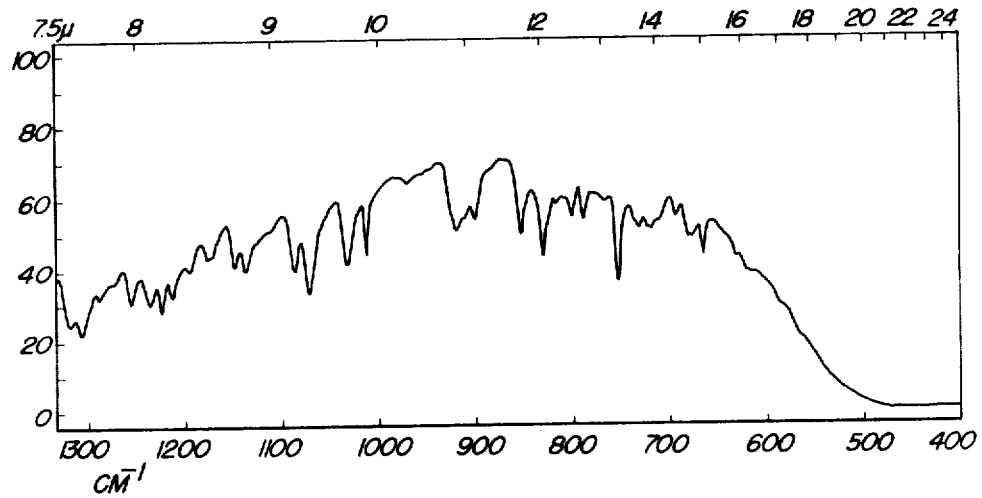
FIG. 7B

FIG. 8A
AMINOPYRINE-MOLECULAR COMPOUND OF ⌈N-(P-CHLOROBENZOYL)-2-METHYL-5-METHOXY-3-INDOLYLACETIC ACID⌋
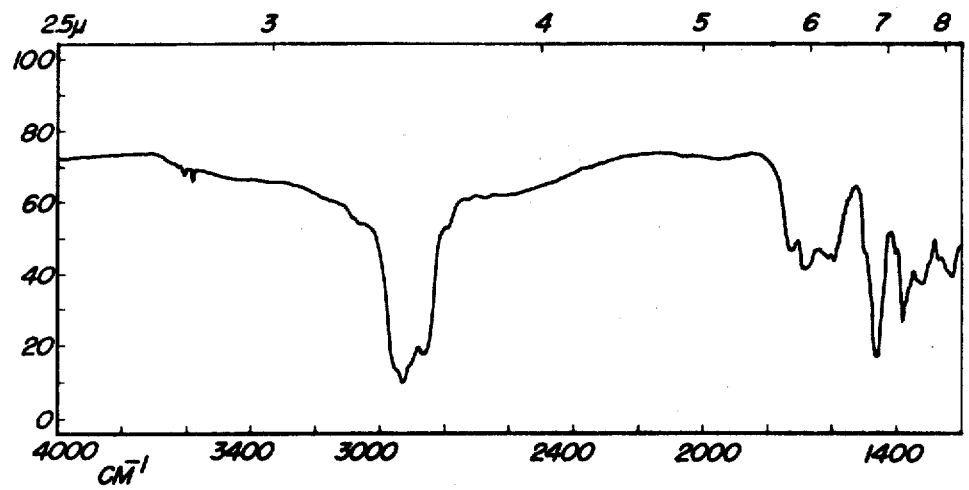
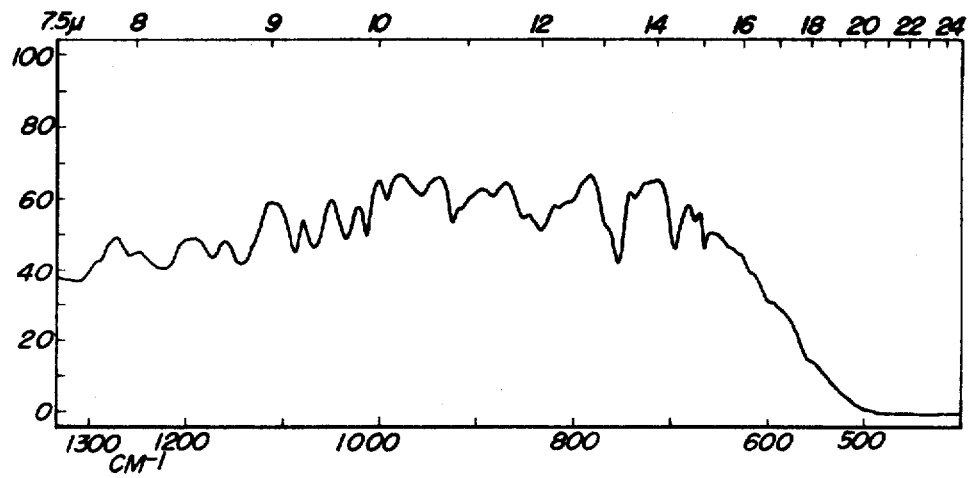
FIG. 8B

FIG. 9A
UROTROPINE-MOLECULAR COMPOUND OF ⌈N-(P-CHLOROBENZOYL)-2-METHYL-5-METHOXY-3-INDOLYLACETIC ACID⌋
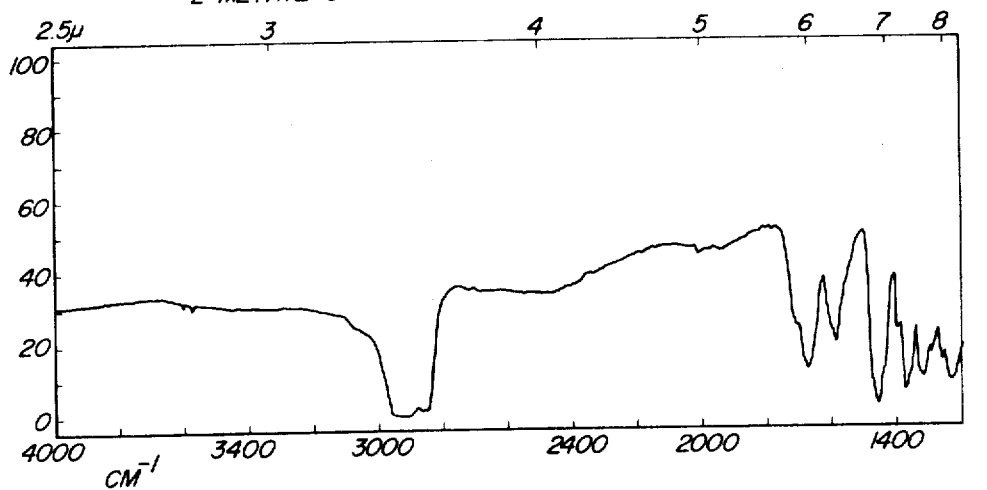
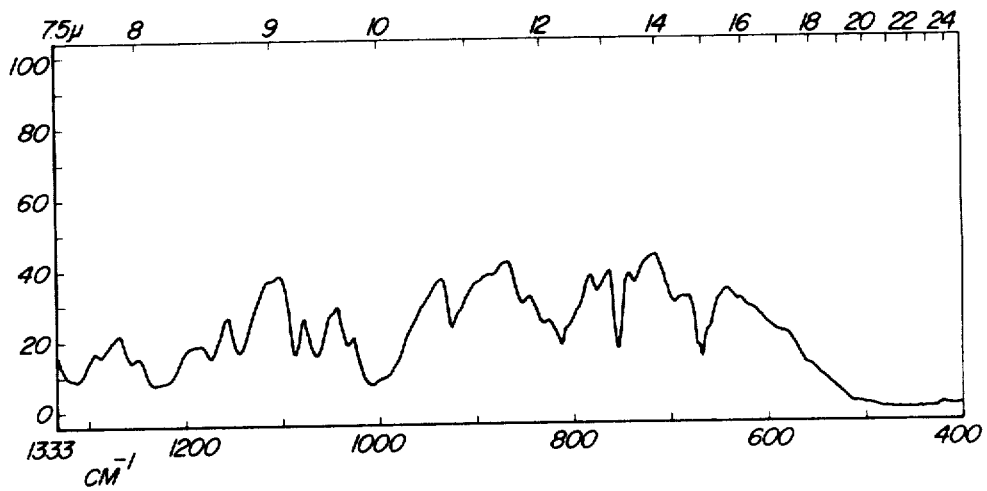
FIG. 9B AMINOPYRINE-MOLECULAR COMPOUND OF ⌈N-NICOTINOYL-2-METHYL-5-METHOXY-3-INDOLYLACETIC ACID⌋

FIG. 11A
AMINOPYRINE-MOLECULAR COMPOUND OF ⌈N-CINNAMOYL-2-METHYL-5-METHOXY-3-INDOLYLACETIC ACID⌋
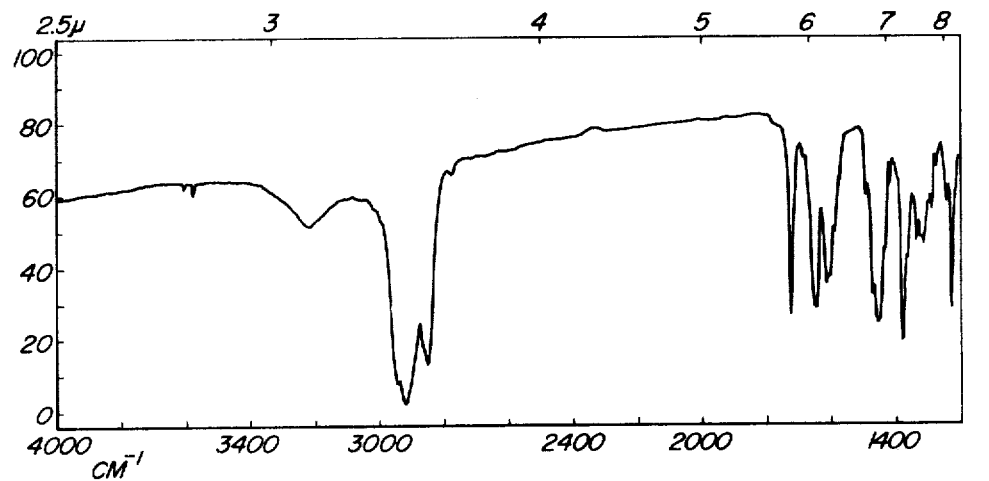
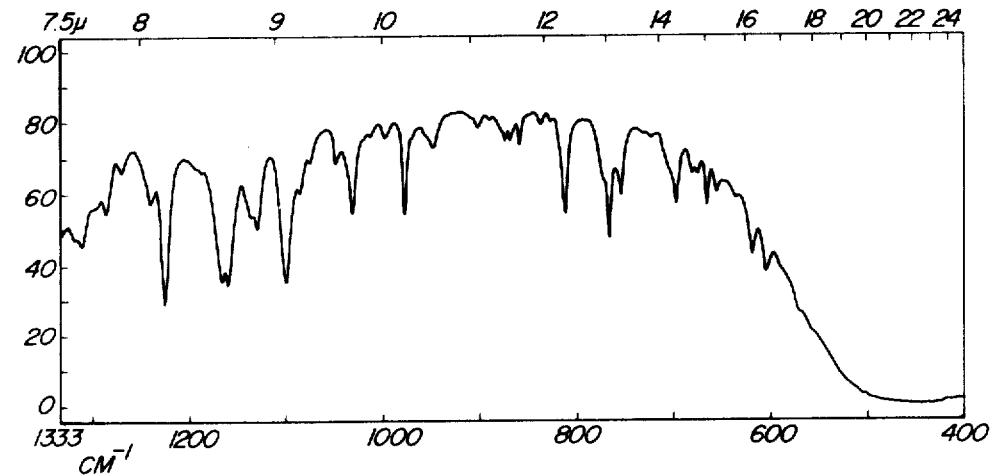
FIG. 11B

FIG. 12A
SODIUM SALT OF ⌐N-NICOTINOYL-2-METHYL-
5-METHOXY-3-INDOLYLACETIC ACID⌐
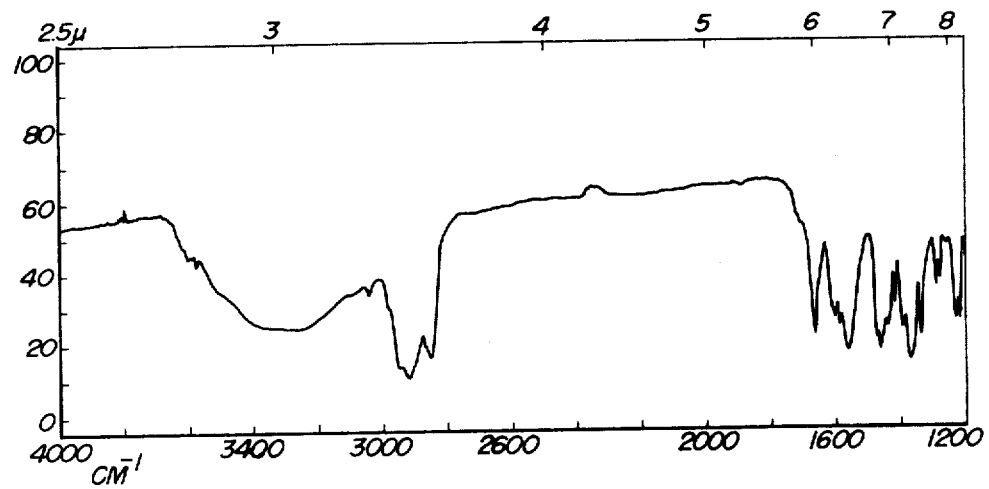
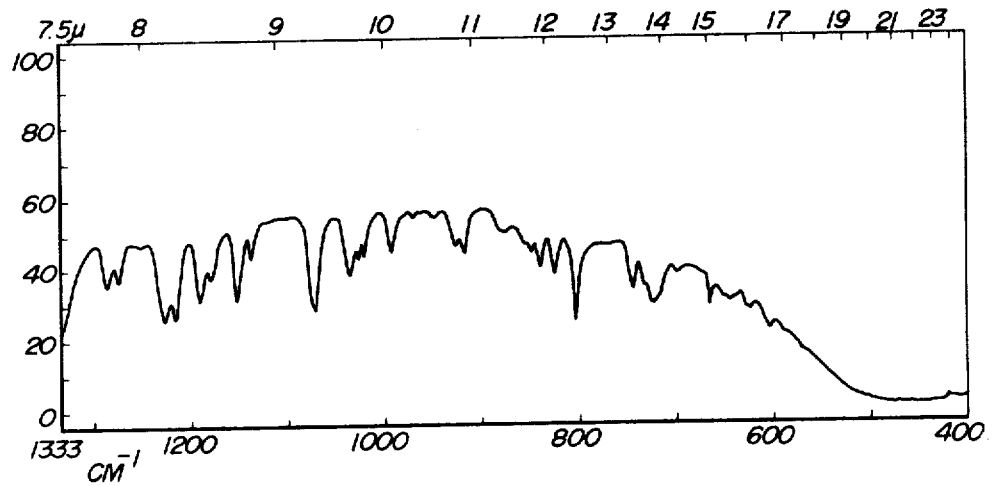
FIG. 12B

FIG. 13A
SODIUM SALT OF "N-CINNAMOYL-2-METHYL-5-METHOXY-3-INDOLYLACETIC ACID"
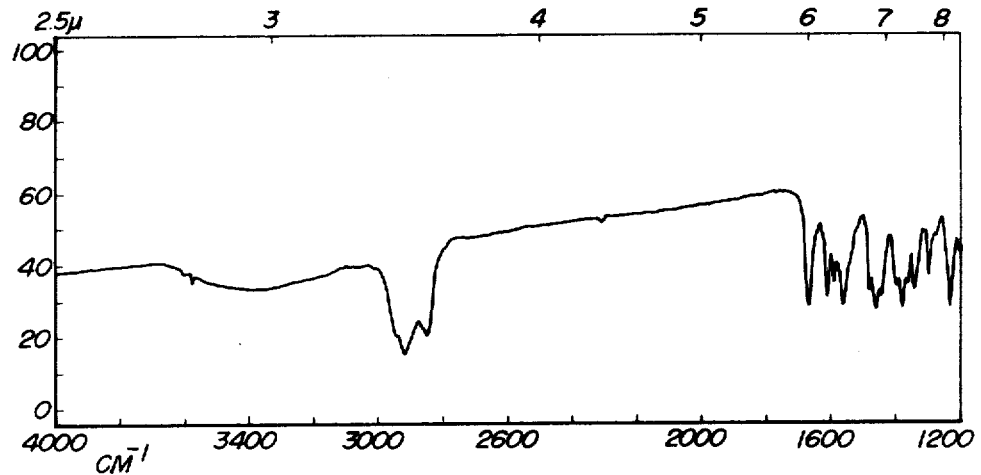
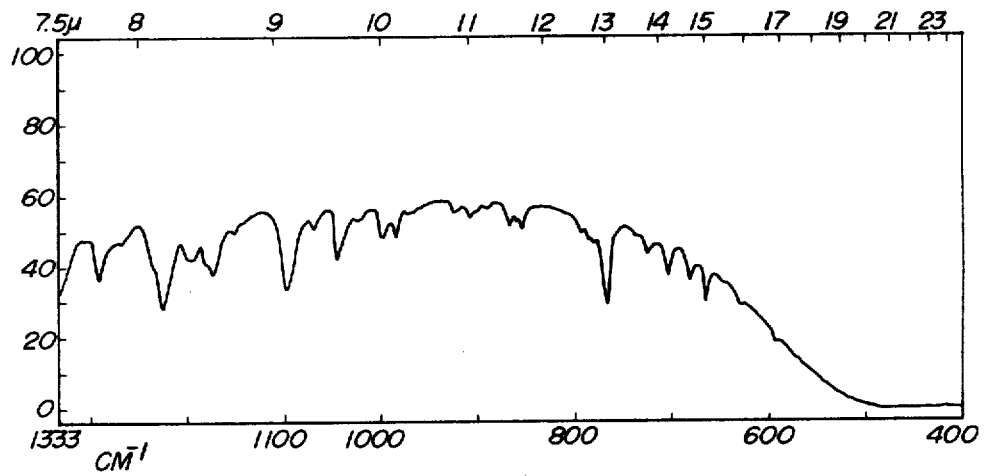
FIG. 13B

FIG. 14A
CALCIUM SALT OF [N-NICOTINOYL-2-METHYL-5-METHOXY-3-INDOLYLACETIC ACID]
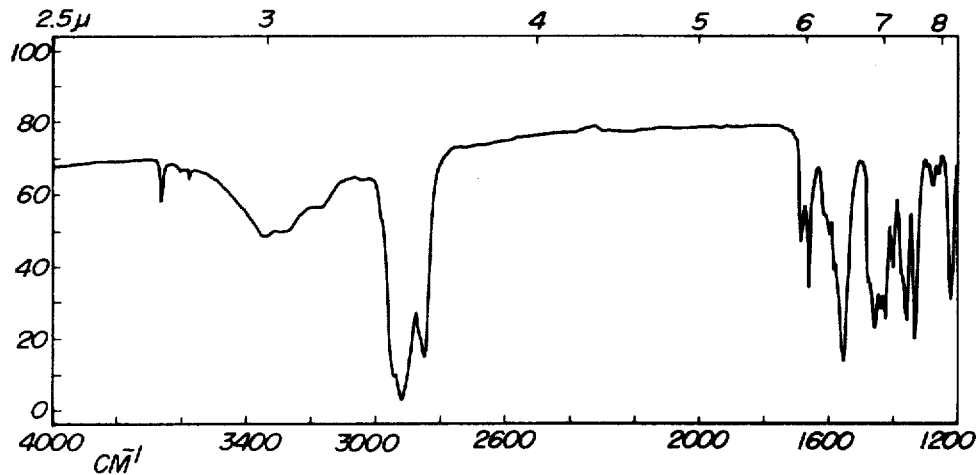
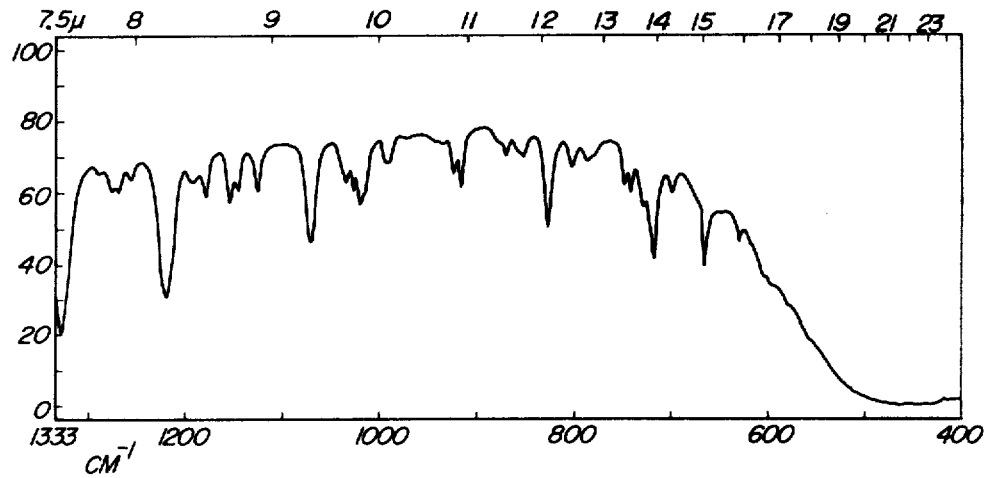
FIG. 14B

FIG. 15A
CALCIUM SALT OF [N-CINNAMOYL-2-METHYL-5-METHOXY-3-INDOLYLACETIC ACID]
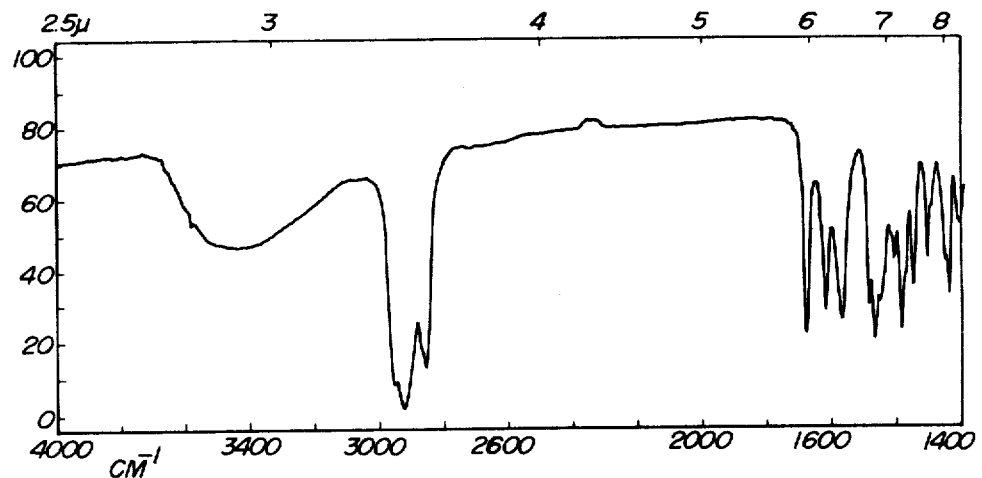
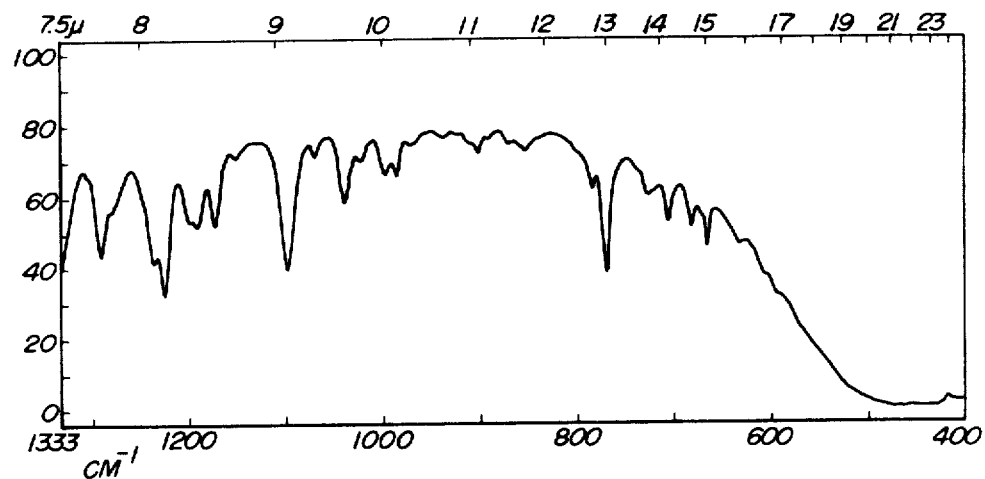
FIG. 15B

FIG. 16A
ALUMINIUM SALT OF ⌈N-NICOTINOYL-2-METHYL-5-METHOXY-3-INDOLYLACETIC ACID⌋
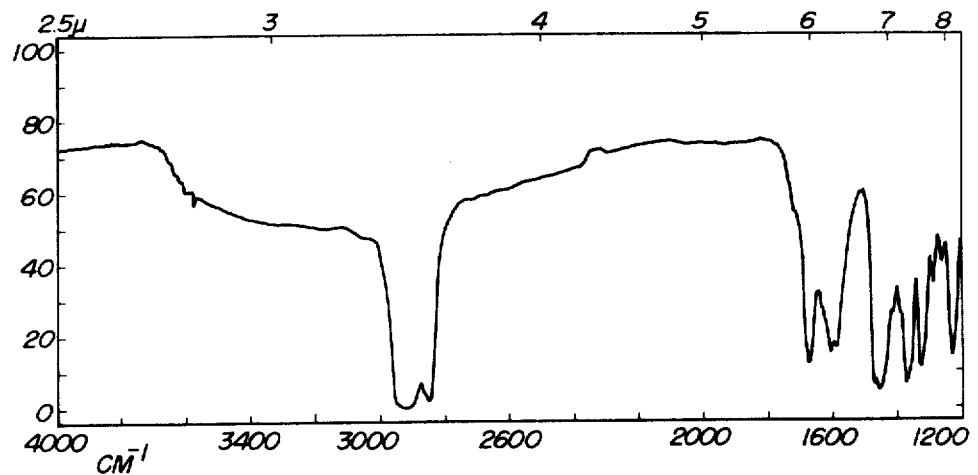
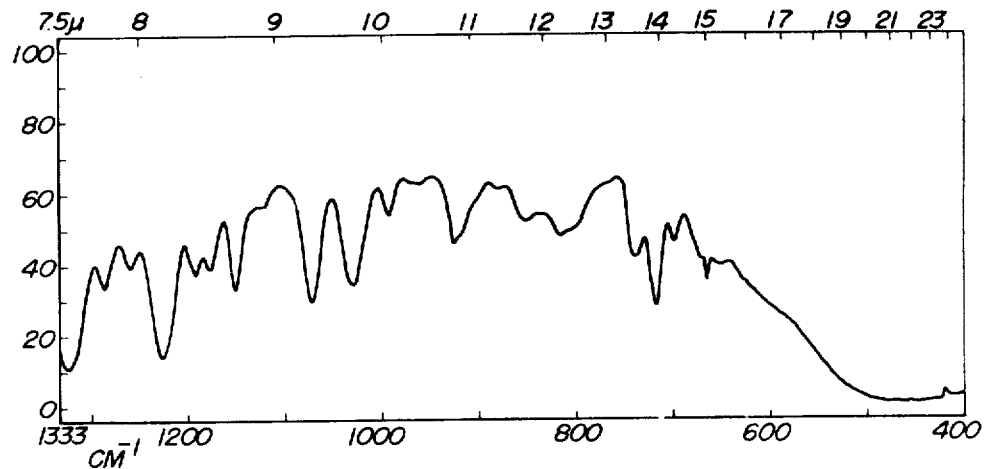
FIG. 16B

ALUMINIUM SALT OF ⎡N-CINNAMOYL-2-METHYL-
5-METHOXY-3-INDOLYLACETIC ACID⎦

SALTS OF INDOLE DERIVATIVES AND A PROCESS FOR PREPARING THE SAME

The present invention relates to salts of indole derivatives and a process for preparing the same. More particularly it relates to alkali metal, alkaline earth metal or aluminum salts or organic amine molecular compounds of 1-acyl-3-indolylaliphatic acid derivatives.

1-acyl-3-indolylaliphatic acid derivatives in the present invention have remarkable anti-inflammatory and anti-pyretic activities. However, the 1-acyl-3-indolylaliphatic acid derivatives are extremely difficult to dissolve in water, and among these 1-acyl-3-indolylaliphatic acid derivatives, for example, 1-(p-chlorobenzoyl)-2-methyl-5-methoxy-3-indolylacetic acid is a weak acid of $pKa = 4$ and its solubility in water is 20–30 $\mu$g/ml., and therefore it is difficult to prepare the injection thereof.

Further, in the case of administration of the tablet thereof, the effect thereof is irregularly exhibited due to diversed rate of absorption, which results in a side effects such as gastrointestinal upset or the like. Therefore, it has been generally used in the form of capsules.

As the process for producing a sodium salt and potassium salt of some 1-acyl-3-indolylaliphatic acids, U.S. Pat. No. 3,294,811 disclosed the process, which comprises dissolving $\alpha$-trifluoromethyl-$\alpha$-[1-(5-chlorothiazol-2-carbonyl)-2-methyl-5-methoxy-3-indolyl]acetic acid in methanol at 0° C., adding thereto sodium methylate dissolved in methanol, condensing the resultant mixture at 10° – 20° C., under reduced pressure, and adding thereto ether to recover the corresponding salt therefrom. Another U.S. Patent, No. 3,271,416 disclosed a process for producing sodium salt, which comprises reacting in a nitrogen stream $\alpha$-(1-benzyl-2-methyl-5-amino-3-indolyl)propionic acid with sodium methylate, condensing the reaction product and adding thereto ether to recover the corresponding sodium salt therefrom.

However, in practicing these known processes, the compounds are prone to coloring, etc. due to hydrolysis of 1-acyl group and oxidative deterioration. Therefore, it is indispensable to conduct temperature control and to carry out the reaction in a nitrogen stream, which results in an extreme complication of operations. That is, none of these processes has been found satisfactory from an industrial point of views.

One object of the present invention is to provide a process for producing salts or molecular compounds of 1-acyl-3-indolylaliphatic acid derivatives.

Another object of the present invention is to provide novel molecular compounds of 1-acyl-3-indolylaliphatic acid derivatives.

Other object of the present invention will be apparent from the following description.

In order to accomplish these objects, the present invention provides a process for preparing alkali metal salts or molecular compounds of 1-acyl-3-indolylaliphatic acid derivatives represented by the formula,

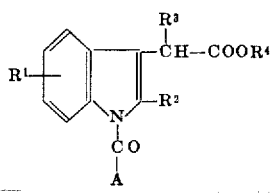

(I)

wherein $R^1$ is hydrogen or halogen atom, an alkyl having up to three carbon atoms or an alkoxy having up to three carbon atoms, $R^2$ is an alkyl having up to three carbon atoms, $R^3$ is hydrogen atom or an alkyl having up to three carbon atoms, $R^4$ is an alkali metal, or an organic amine residue, and A is a phenyl substituted by halogen atom at an optional position, styryl or pyridyl, which comprises adding about 1 mole of the 1-acyl-3-indolylaliphatic acid derivative represented by the formula,

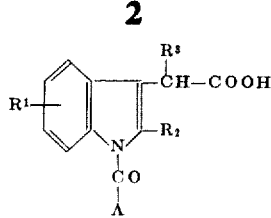

(II)

wherein $R^1$, $R^2$, $R^3$ and A have the same meanings as defined in the formula (I), to an organic solvent, preferably acetone or methanol, and reacting in the presence of a small amount of water the resultant mixture with about 0.5 mole of carbonate or about 1 mole of bicarbonate of an alkali metal, or about 1 mole of organic amine, for example ethanolamine, triethanolamine, diethylaminoethanol, ethylenediamine, histidine, arginine, lysine, ornithine, citrullin, glucosamine, aminopyrine, chlorpheniramine, ergotamine, urotropin, thiamine or pyridoxamine to yield the alkali metal salt or the organic amine molecular compound of the formula I.

Further the present invention provides a process for producing alkaline earth metal or aluminum salts of 1-acyl-3-indolylaliphatic acid derivative represented by the formula,

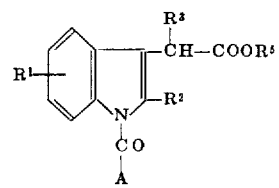

(III)

wherein $R^1$, $R^2$, $R^3$ and A have the same meanings as defined above and $R^5$ is an alkaline earth metal or aluminum, which comprises reacting a soluble salt of an alkaline earth metal or of aluminum with the said alkali metal salt represented by the formula (I) in the presence of water to yield the alkaline earth metal or aluminum salt of the formula (III).

Furthermore the present invention provides novel organic amine molecular compounds represented by the above formula I wherein $R^4$ is organic amine residue.

The process of the present invention in which the reaction is carried out in an organic solvent between the present indolylaliphatic acid derivatives and carbonate or bicarbonate of an alkali metal or organic amines is most advantageous from a commercial point of view to obtain the desired product in high yield and free from being occluded with coloring matters, wherein strict control of temperature conditions and production operation in a nitrogen stream are not required. Furthermore, novel molecular compounds of arginine, aminopyrine, urotropin, etc. can readily be obtained by the present process.

The amine salts, aminoacid salts, arginine salts aminopyrine salts, chlorpheniramine salts, urotropine salts and thiamine salts, produced according to the process of the present invention are novel compound which the present inventors have first synthesized.

1-acyl-3-indolylaliphatic acid derivatives used in the present invention are produced according to a process described in the specification of Belgian Pat. No. 679,678 or 698,378. Examples of the 1-acyl-3-indolylaliphatic acid derivatives include the following compounds:

1-cinnamoyl-2-methyl-5-methoxy-3-indolylacetic acid
$\alpha$-[1-(p-chlorobenzoyl)-2-methyl-5-methoxy-3-indolyl]propionic acid
1-p-chlorobenzoyl-2-methyl-5-methoxy-3-indolylacetic acid
1-nicotinoyl-2-methyl-5-methoxy-3-indolylacetic acid
1-isonicotinoyl-2-methyl-5-methoxy-3-indolylacetic acid
1-p-chlorobenzoyl-2,5-dimethyl-3-indolylacetic acid 1-p-bromobenzoyl-2-methyl-5-methoxy-3-indolylacetic acid In producing an alkali metal salt of 1-acyl-3-indolylaliphatic acid derivative of the formula (I) wherein $R^4$ is an alkali metal, a 1-acyl-3-indolylaliphatic acid derivative of the formula (II) is added to an organic solvent such as methanol or acetone and carbonate or bicarbonate of an alkali metal such as sodium or potassium is added to the resultant mixture and further a small amount of water is added thereto.

The reaction mixture is stirred to complete the reaction until occurrence of carbon dioxide gas ceased.

The solvent is used in an amount sufficient to dissolve or suspend the 1-acyl-3-indolylaliphatic acid derivative of the formula (I).

The reaction temperature is from 15° C. to a boiling point of the solvent, preferably from 50° to 70° C.

The reaction period of time is dependent upon a concentration of 1-acyl-3-indolylaliphatic acid derivative of the formula (II) in the reaction mixture and the reaction temperature and in many cases the reaction is completed within 1 hour.

The amount of water added to the reaction mixture is from 5 percent to 20 percent, preferably about 10 percent, by volume of the mixture containing the organic solvent and the 1-acyl-3-indolylaliphatic acid derivative of the formula (II).

After the reaction is over the reaction mixture is subjected to concentration under reduced pressure to give a residue containing the alkali metal salt of the formula (I) wherein $R^4$ is an alkali metal.

In production of an organic amine molecular compound of the formula (I) wherein $R^4$ is an organic amine residue, a 1-acyl-3-indolylaliphatic acid derivative of the formula (II) is added to an organic solvent such as methanol or acetone and the organic amine such as ethanolamine, triethanolamine, diethylaminoethanol, ethylenediamine, histidine, arginine, lysine, ornithine, citrullin, glucosamine, aminopyrine, chlorpheniramine, ergotamine, urotropin, thiamine or pyridoxamine is added to the resultant mixture and the reaction mixture is stirred for about 1 hour to complete the reaction.

The amount of the solvent is similar to that of the alkali metal salt formation mentioned above.

It is not always necessary to heat the reaction mixture, but it is preferably to heat the reaction mixture at 50° to 70° C.

After the reaction is over, the reaction product is separated from the reaction mixture by subjecting the reaction mixture to concentration under reduced pressure to obtain the organic amine molecular compound of the formula (I) wherein $R^4$ is an organic amine residue as a crystalline residue.

In production of an alkaline earth metal salt or aluminum salt of the 1-acyl-3-indolylaliphatic acid derivative of the formula (III) a soluble salt of an alkaline earth metal or aluminum is reacted with the alkali metal salt of a 1-acyl-3-indolylaliphatic acid derivative of the formula (I) in the presence of water to yield the alkaline earth metal salt or aluminum salt.

Examples of the soluble salt of the alkaline earth metal or aluminum are magnesium chloride, strontium chloride, calcium chloride, aluminum chloride or aluminum sulfate. The reaction between the soluble salt of the alkaline earth metal or aluminum and the alkali metal salt of the 1-acyl-3-indolylaliphatic acid derivative is completed by only adding the soluble salt of the alkaline earth metal or aluminum to an aqueous solution of the alkali metal salt of the 1-acyl-3-indolylaliphatic acid derivative and stirring the resultant mixture at room temperature for about 1 hour.

Only in the case of production of calcium salt of the 1-acyl-3-indolylaliphatic acid derivative of the formula (III) in which A represents pyridyl, the reaction time requires about 24 hours at a reaction temperature of room temperature. The desired alkaline earth metal salt or aluminum salt of the formula (III) precipitates in the reaction mixture and is separated from the reaction mixture by filtration.

Yield of the salt formation or molecular compound formation of the present invention is almost quantitative based on the amount of consumed 1-acyl-3-indolylaliphatic acid derivative of the formula (II).

Examples of the salts or molecular compounds thus obtained are as follows, but the present invention is not limited to them.

Sodium 1-isonicotinoyl-2-methyl-5-methoxy-3-indolylacetate
Potassium 1-isonicotinoyl-2-methyl-5-methoxy-3-indolylacetate
Sodium 1-nicotinoyl-2-methyl-5-methoxy-3-indolyacetate
Potassium 1-nicotinoyl-2-methyl-5-methoxy-3-indolylacetate
Calcium 1-nicotinoyl-2-methyl-5-methoxy-3-indolylacetate
Aluminum 1-nicotinoyl-2-methyl-5-methoxy-3-indolylacetate
Ethanol ammonium salt of 1-nicotinoyl-2-methyl-5-methoxy-3-indolylacetic acid
Glucosaminium salt of 1-nicotinoyl-2-methyl-5-methoxy-3-indolylacetic acid
Sodium 1-nicotinoyl-2-methyl-5-chloro-3-indolylacetate
Sodium 1-nicotinoyl-2,5-dimethyl-3-indolylacetate
Calcium 1-nicotinoyl-2,4-dimethyl-3-indolylacetate
Sodium 1-nicotinoyl-2,6-dimethyl-3-indolylacetate
Potassium α[1-nicotinoyl-2-methyl-5-methoxy-3-indolyl]propionate
Potassium γ[1-nicotinoyl-2-methyl-5-methoxy-3-indolyl]butyrate
Sodium 1-cinnamoyl-2-methyl-5-methoxy-3-indolylacetate
Potassium 1-cinnamoyl-2-methyl-5-methoxy-3-indolylacetate
Magnesium 1-cinnamoyl-2-methyl-5-methoxy-3-indolylacetate
Calcium 1-cinnamoyl-2-methyl-5-methoxy-3-indolylacetate
Ethanol ammonium salt of 1-cinnamoyl-2-methyl-5-methoxy-3-indolylacetic acid
N,N-dimethylethanol ammonium salt of 1-cinnamoyl-2-methyl-5-methoxy-3-indolylacetic acid
Glucosaminium salt of 1-cinnamoyl-2-methyl-5-methoxyindolylacetic acid
Triethylammonium salt of 1-cinnamoyl-2-methyl-5-methoxy-3-indolylacetic acid
Sodium 1-cinnamoyl-2-methyl-5-chloro-3-indolylacetate
Potassium 1-cinnamoyl-2-methyl-3-indolylacetate
Sodium 1-cinnamoyl-2-methyl-5-ethoxy-β-indolylacetate
Sodium α-(1-cinnamoyl-2-methyl-5-methoxy-3-indolyl)propionate
Sodium β-(1-cinnamoyl-2-methyl-5-methoxy-3-indolyl)propionate
Sodium α-(1-cinnamoyl-2-methyl-5-methoxy-3-indolyl)butyrate
Sodium 1-(p-methylcinnamoyl)-2-methyl-5-methoxy-3-indolylacetate
Sodium 1-(α-methyl-cinnamoyl)-2-methyl-5-methoxy-3-indolylacetate
Sodium 1-(α-methyl-p-chlorocinnamoyl)-2-methyl-5-methoxy-3-indolylacetate
Potassium 1-(β-phenyl-cinnamoyl)-2-methyl-5-methoxy-3-indolylacetate
Potassium 1-(β-benzyl-cinnamoyl)-2-methyl-5-methoxy-3-indolylacetate
Potassium 1-(α,β-dibromocinnamoyl)-2-methyl-5-methoxy-3-indolylacetate
Potassium 1-cinnamoyl-2-methyl-5-methylthio-3-indolylacetate
Potassium 1-(p-chlorocinnamoyl)-2-methyl-5-methoxy-3-indolylacetate
Potassium 1-(p-bromocinnamoyl)-2-methyl-5-methoxy-3-indolylacetate
Potassium 1-(p-methoxy-cinnamoyl)-2-methyl-5-methoxy-3-indolylacetate
Potassium 1-(p-nitrocinnamoyl)-2-methyl-5-methoxy-3-indolylacetate Sodium 1-(p-methylthiocinnamoyl)-2-methyl-5-methoxy-3-indolylacetate Sodium 1-(3'-phenylcrotonoyl)-2-methyl-5-methoxy-3-indolylacetate 1-(2-α-naphthylacryloyl)-2-methyl-5-methoxy-3-indolylacetic acid Calcium 1-(α-naphthylacetyl)-2-methyl-5-methyl-5-methoxy-3-indolylacetate Sodium 1-(2'-furylacetyl)-2-methyl-5-methoxy-3-indolylacetate Sodium 1-(2-thienylacetyl)-2-methyl-5-methoxy-3-indolylacetate Sodium 1-phenylacetyl-2-methyl-5-methoxy-3-indolylacetate Sodium 1-(p-chlorophenylacetyl)-2-methyl-5-methoxy-3-indolylacetate Calcium 1-(p-methoxyphenylacetyl)-2-methyl-5-methoxy-3-indolylacetate Calcium 1-(p-tolylacetyl)-2-methyl-5-methoxy-3-indolylacetate Calcium 1-(3',4'-dimethoxyphenylacetyl)-2-methyl-5-methoxy-3-indolylacetate Calcium 1-(2'-phenylbutyroyl)-2-methyl-5-methoxy-3-indolylacetate These compounds exhibited a remarkable anti-inflammatory activity in animal tests. Thus, these salts serve as effective anti-inflammatory agents having minimum side-effects and very low toxicity.

Sodium or potassium salts of indolylaliphatic acid derivatives, obtained by the process of the present invention are so soluble in water that they are enable to prepare a solid injection with a suitable amount of injectable drugs such as mannitol, glucose, sodium chloride, glycine, sodium glutamate, aminopyrine, caffeine, sodium salicylate. When they are administered orally as a capsule, the absorption rate is very high and the maximum blood concentration can be reached in about 30 minutes. Further they can be directly pressed into tablets, and moreover an excipient such as magnesium aluminate silicate having anti-acid activity can be used with them.

The present soluble salts of indolylaliphatic acid derivatives are also fat-soluble, partition coefficient between chloroform and water being 25 at pH 7, so that they are very useful as ointments and suppositories.

The present molecular compound of indolylaliphatic acid derivative with arginine scarcely undergoes color change by ultraviolet radiation as compared with other indolylaliphatic acid derivatives, finding wide application for pharmaceutical use.

By the application of the salts of indolylaliphatic acid derivatives such as the aluminum or calcium salts which are less soluble than sodium or potassium salt, side-effects such as gastroenteric troubles can be lessened. Molecular compounds of the indolylaliphatic acid derivatives with a compound having anti-pyretic and analgesic activities, and uric acid combining substance, such as aminopyrine or urotropine have increased pharmacological activities with lesser side-effects so that they are pharmacologically very useful.

Figure 10A:
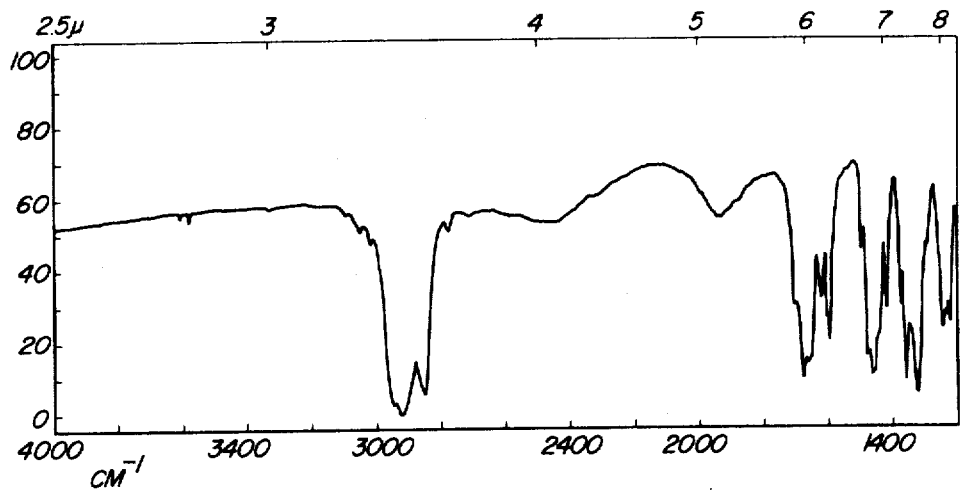
Figure 10B:
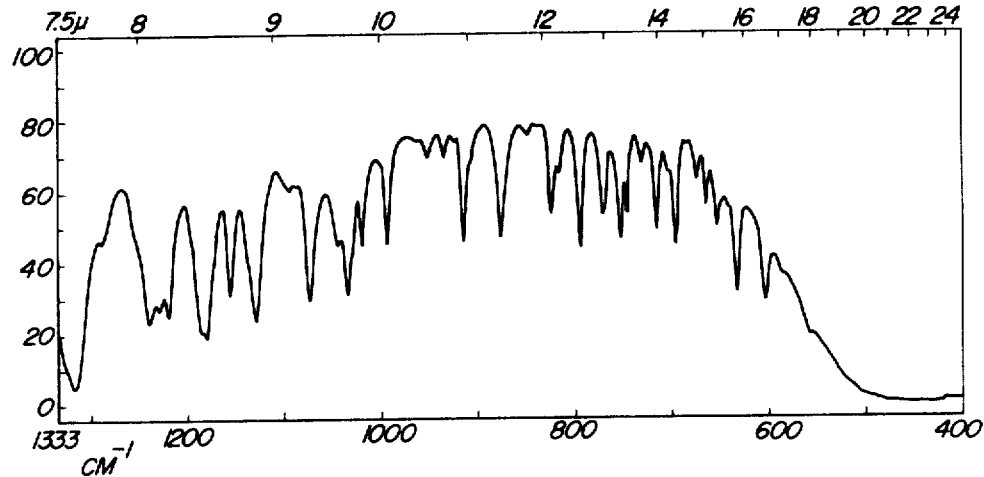
Figure 17A:
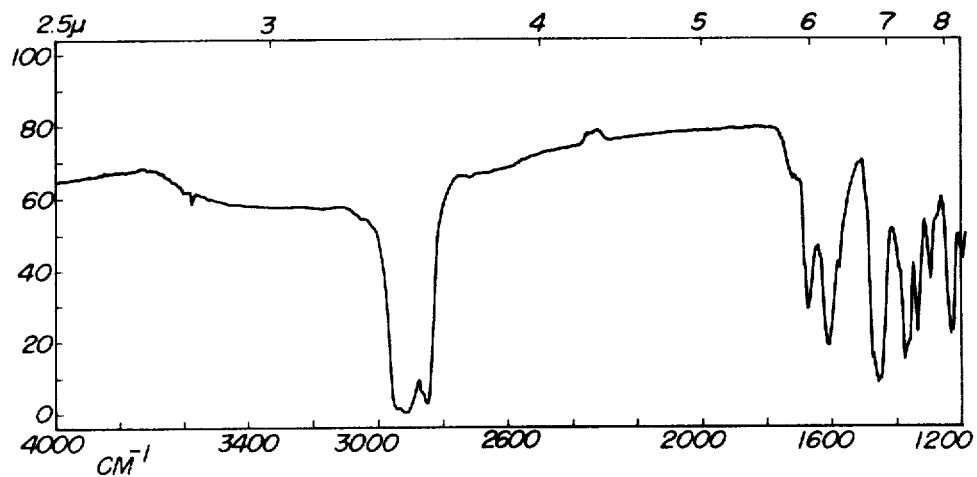
Figure 17B:
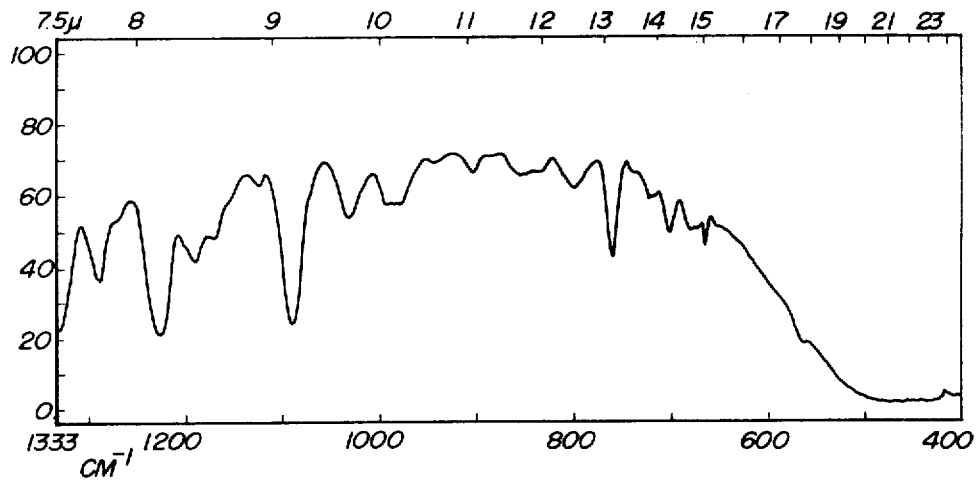

In the accompanying drawings, FIG. 1, 2, 3, 4, 5 and 6 individually shows Infra-Red absorption spectrums (Nujol) of sodium, potassium, magnesium, calcium, strontium and aluminum salts of N-(p-chlorobenzoyl)-2-methyl-5-methoxy-3-indolylacetic acid obtained according to the present invention and FIG. 7, 8 and 9 individually shows Infra-Red absorption spectrum (Nujol) of arginine-, aminopyrine- and urotropine-molecular compound of N-(p-chlorobenzoyl)-2-methyl-5-methoxy-3-indolylacetic acid obtained according to the present invention. FIG. 10 shows Infra-Red absorption spectrum (Nujol) of aminopyrine-molecular compound of N-(nicotinoyl)-2-methyl-5-methoxy-3-indolylacetic acid obtained according to the present invention. FIG. 11 shows Infra-Red absorption spectrum (Nujol) of aminopyrine-molecular compound of N-cinnamoyl-2-methyl-5-methoxy-3-indolylaliphatic acid obtained according to the present invention. FIG. 12, 14 and 16 shows Infra-Red absorption spectrum (Nujol) of sodium, calcium and aluminum salts of N-nicotinoyl-2-methyl-5-methoxy-3-indolylacetic acid and FIG. 13, 15 and 17 show sodium, calcium and aluminum salts of N-cinnamoyl-2-methyl-5-methoxy-3-indolylacetic acid obtained according to the present invention.

The following examples are given to illustrate the present invention but are not intended to limit it thereto.

EXAMPLE 1

To a solution of 10 g. of 1-p-chlorobenzoyl-2-methyl-5-methoxy-3-indolylacetic acid in 50 ml. of acetone was added a solution of 2.4 g. of sodium bicarbonate in 5 ml. of water, and the mixture was heated under stirring until occurence of carbon dioxide gas ceased. After completion of the reaction, the reaction mixture was concentrated to a residue, which was recrystallized from ethanol-ether to give 10.1 g. of slightly yellow crystals of sodium 1-p-chlorobenzoyl-2-methyl-5-methoxy-3-indolylacetate, melting point 235° C. (decomp.).

According to the similar procedure, yellow crystals of sodium 1-cinnamoyl-2-methyl-5-methoxy-3-indolylacetate having melting point of 247° − 252° C. (decomp.) and pale yellow crystals of sodium N-(isonicotinoyl)-2-methyl-5-methoxyacetate having melting point of 72° − 75° C.

EXAMPLE 2

According to the method described in Example 1, treatment of 10 g. of light yellow 1-p-chlorobenzoyl-2-methyl-5-methoxy-3-indolylacetic acid with 2.8 g. of potassium bicarbonate in acetone gave 10.8 g. of potassium 1-p-chloro-benzoyl-2-methyl-5-methoxy-3-indolylacetate having melting point of 128°−131° C.

EXAMPLE 3

In 100 ml. of water was dissolved 10 g. of sodium 1-(p-chlorobenzoyl)-2-methyl-5-methoxy-3-indolylacetate. An aqueous solution of magnesium chloride was added thereto until the deposition of crystals was no more observed. The deposited crystals were collected by filtration, washed with water and ethanol, dried to give white crystals of magnesium N-(p-chlorobenzoyl)-2-methyl-5-methoxy-3-indolylacetate.

According to the similar procedure to that stated above, calcium salt (pale yellow crystals), strontium salt (yellow crystals) of 1-(p-chlorobenzoyl)-2-methyl-5-methoxy-3-indolyl-acetic acid, calcium 1-(nicotinoyl)-2-methyl-5-methoxy-3-indolyl acetate [yellow crystals, m.p. 185° − 190° C. (decomp.)] and calcium N-(cinnamoyl)-2-methyl-5-methoxy-3-indolylacetate (yellow crystals) were obtained.

EXAMPLE 4

In 20 ml. of water was dissolved 10 g. of sodium 1-(p-chlorobenzoyl)-2-methyl-5-methoxy-3-indolylacetate. An aqueous solution of aluminum chloride was added thereto until the deposition of crystals was no more observed. The obtained crystals were collected by filtration, washed with water, dried to give yellow aluminum 1-(p-chlorobenzoyl)-2-methyl-5-methoxy-3-indolylacetate.

According to the similar procedure to that mentioned above, aluminum 1-(nicotinoyl)-2-methyl-5-methoxy-3-indolylacetate (yellow crystals) and aluminum 1-(cinnamoyl)-2-methyl-5-methoxy-3-indolylacetate (yellow crystals) were obtained.

EXAMPLE 5

To a solution of 1-p-chlorobenzoyl-2-methyl-5-methoxy-3-indolylacetic acid in 50 ml. of acetone was added 4.9 g. of arginine and 5 ml. of water. After addition, acetone was distilled to an oily residue. The residue was dried to give 15 g. (quantitative) of yellow arginine 1-p-chlorobenzoyl-2-methyl-5-methoxy-3-indolylacetate.

EXAMPLE 6

The mixture of 10 g. (0.028 mol) of 1-(p-chlorobenzoyl)-2-methyl-5-methoxy-3-indolylacetic acid, 6.5 g. (0.028 mol) of aminopyrine and 75 ml. of acetone was heated until the reaction was completed. The reaction mixture was concentrated under reduced pressure, and the residue was dried to give yellow crystals of a molecular compound of 1-(p-chlorobenzoyl)-2-methyl-5-methoxy-3-indolylacetic acid with aminopyridine.

In the same manner as stated above, molecular compounds 1-(nicotinoyl)-2-methyl-5-methoxy-3-indolylacetic acid (yellow crystals) and 1-(cinnamoyl)-2-methyl-5-methoxy-3-indolylacetic acid (yellow crystals) were obtained.

EXAMPLE 7

The mixture of 10 g. (0.028 mol.) of 1-(p-chlorobenzoyl)-2-methyl-5-methoxy-3-indolylacetic acid, 3.9 g. (0.028 mol.) of urotropin, and 75 ml. of methanol was heated until the reaction was completed. The reaction mixture was concentrated under reduced pressure to a residue which was dried to give yellow crystals of a molecular compound of 1-(p-chlorobenzoyl)-2-methyl-5-methoxy-3-indolylacetic acid and urotropin.

EXAMPLE 8

Prescription 1.

| | |
|---|---|
| Sodium N-(p-chlorobenzoyl)-2-methyl-5-methoxy-3-indolylacetate | 10.0 g. |
| Magnesium aluminate silicate | 104.4 g. |
| Calcium carboxymethylcellulose | 6.3 g. |
| Talc | 3.8 g. |
| Magnesium stearate | 0.6 g. |
| Total | 125.1 g. |

A mixture of 71.6 g. of magnesium aluminate silicate and 10.0 g. of the sodium salt was passed through a sieve, and further added with 32.8 g. of magnesium aluminate silicate, 6.3 g. of calcium carboxymethylcellulose, 3.8 g. of talc and 0.6 g. of magnesium stearate, and directly pressed into tablets.

Prescription 2.

Each 50 mg. of the sodium and potassium salt was homogeneously mixed with 450 mg. of an excipient such as mannitol, glucose, sodium chloride, glycine, sodium glutaminate or sodium salicylate, and the mixture was sterilized by an appropriate method to prepare a solid injection.

The results of an examination as to stability are shown below (at 50° C. in ampoule).

| | Residual percentages of sodium and potassium salts of N-(p-chlorobenzoyl)-2-methyl-5-methoxy-3-indolylacetic acid | | | |
|---|---|---|---|---|
| | 0 | 15 | 30 | 60 days |
| Sodium salt + Mannitol | 100 | 97 | 95 | 93% |
| Potassium salt + Mannitol | 100 | 100 | 98 | 98% |

What we claim is:

1. A process for preparing alkali metal salts or organic amine molecular compounds, the said organic amine being ethanolamine, triethanolazmine, diethylaminoethanol, ethylenediamine, histidine, arginine, lysine, ornithine, citrullin, glucosamine, aminopyrine, chlorpheniramine, ergotamine, urotropin, thiamine or pyridoxamine, of 1-acyl-3-indolylaliphatic acid derivatives of the formula,

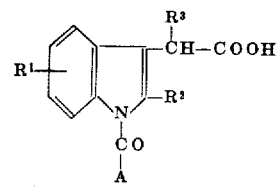

wherein $R^1$ is hydrogen or a halogen atom, an alkyl having up to three carbon atoms or an alkoxy having up to three carbon atoms, $R^2$ is an alkyl having up to three carbon atoms, $R^3$ is hydrogen atom or an alkyl having up to three carbon atoms, and A is a phenyl substituted by halogen atom at an optional position, styryl or pyridyl, which comprises dissolving about 1 mole of the said 1-acyl-3-indolylaliphatic acid derivative in an organic solvent selected from the group consisting of acetone, methanol and ethanol to obtain a solution of the said 1-acyl-3-indolylaliphatic acid derivative and reacting the resultant solution in the presence of water in an amount of from 5 to 20 percent by volume of said solution with about 0.5 mole of an alkali metal carbonate or about 1 mole of an alkali metal bicarbonate or about 1 mole of the said organic amine at a temperature from 15° C. to a boiling point of the said solvent to yield the alkali metal salt or the organic amine molecular compound.

2. A process according to claim 1, wherein the temperature is 50° – 70° C.

3. A process according to claim 1, wherein the amount of water is about 10 percent by volume of said solution.

4. A process for preparing sodium salt or arginine salt of 1-(p-chlorobenzoyl)-2-methyl-5-methoxy-3-indolylacetic acid, which comprises dissolving 1 mole of 1-(p-chlorobenzoyl)-2-methyl-5-methoxy-3-indolylacetic acid in acetone and adding to the acetone solution an aqueous solution consisting of 1 mole of sodium bicarbonate or 1 mole of arginine and 10 percent by volume of the acetone solution of water at 50° – 70° C. to yield sodium 1-(p-chlorobenzoyl)-2-methyl-5-methoxy-3-indolylacetate or arginine 1-(p-chlorobenzoyl)-2-methyl-5-methoxy-3-indolylacetate.

* * * * *